United States Patent
LaBrash (12)

(10) Patent No.: US 6,342,297 B1
(45) Date of Patent: Jan. 29, 2002

(54) FUGITIVE ROLLED SUBSTRATE MATERIAL TAIL TIE ADHESIVE AND METHOD OF USE THEREOF

(75) Inventor: Robert A. LaBrash, Roseville, MN (US)

(73) Assignee: H. B. Fuller Licensing + Financing Inc., St. Paul, MN (US)

( * ) Notice: Subject to any disclaimer, the term of this patent is extended or adjusted under 35 U.S.C. 154(b) by 0 days.

(21) Appl. No.: 09/434,175

(22) Filed: Nov. 5, 1999

Related U.S. Application Data

(60) Provisional application No. 60/107,132, filed on Nov. 5, 1998.

(51) Int. Cl.⁷ ............................. B32B 15/04; B32B 7/12; B32B 23/00

(52) U.S. Cl. .................. 428/343; 478/344; 478/355 R; 478/689; 478/906

(58) Field of Search ................................. 428/343, 344, 428/355 R, 689, 906

(56) References Cited

U.S. PATENT DOCUMENTS

| | | | |
|---|---|---|---|
| 3,124,474 A | 3/1964 | Beaver et al. | |
| 4,508,773 A | 4/1985 | Maxwell | |

*Primary Examiner*—Duc Truong
(74) *Attorney, Agent, or Firm*—Bin Su

(57) ABSTRACT

The present invention generally relates to a water-based tail tie adhesive for a rolled substrate material and a method of use thereof in the manufacture of rolled substrate material to secure the loose tail end of the roll to the body of the roll. More specifically, the invention is directed to a fugitive tissue and towel tail tie adhesive comprising at least one water soluble cellulose derivative and effective amount of magnesium sulfate, and optionally at least one water soluble polyol and at least one functionalized polyol such as polyester polyol, polyether polyol, polyesterether polyol, polyhydroxy compound and combinations thereof. Another aspect of the invention relates to a rolled substrate material comprising a web of substrate material rolled onto a cylindrical core, the tail end of said rolled substrate being secured to the roll by a film of the adhesive composition. The treated rolled substrate material exhibits improved releasability, leaves no stain and reduced bond strength.

23 Claims, 1 Drawing Sheet

FUGITIVE ROLLED SUBSTRATE MATERIAL TAIL TIE ADHESIVE AND METHOD OF USE THEREOF

This application claims the benefit of the priority of U.S. Provisional Application Ser. No. 60/107,132 filed on Nov. 5, 1998.

FIELD OF INVENTION

The present invention generally relates to a water-based tail tie adhesive for a rolled substrate material and a method of use thereof in the manufacture of rolled substrate material to secure the loose tail end of the roll to the body of the roll. More specifically, the invention is directed to a water-based fugitive tissue and towel tail tie adhesive comprising at least one or more water soluble cellulose derivative and an effective amount of magnesium sulfate and optionally, at least one water soluble polyol and at least one functionalized polymeric polyol including polyester polyol, polyether polyol, polyesterether polyol, polyhydroxy compound and combinations thereof Another aspect of the invention relates to a rolled substrate material comprising a web of substrate material rolled onto a cylindrical core, the tail end of said rolled substrate being secured to the roll by a film of the water-based tail tie adhesive composition. The treated rolled substrate material exhibits improved releasability, leaves no stain and reduced bond strength.

BACKGROUND OF THE INVENTION

In general, the production of a roll of tissue or paper toweling leaves a loose tail end on the roll. This loose tail, if left in this condition can cause jamming of the following production line and final packaging equipment. To enable better production speed, an adhesive is applied, usually as a low solids solution by spray or extrusion methods, to the otherwise loose tail of the roll and rolled up tight to the body of the roll or alternatively applied to the body of the roll after which the tail is rolled into contact with the body of the roll. This type of adhesive is known as a tissue/towel tail tie or tail control adhesive. Consumer preference requires that the bonding of the tail be light enough to be easily pulled loose from the body of the roll without tearing the tissue.

A typical tissue/towel tail tie adhesive formulation consists of a solution in water of a water soluble chemically modified form of cellulose derived from a suitable source in a low solid content. Without additives to decrease the bond strength, this cellulose solution would form an excessively strong bond between the tissue tail and the body of the roll.

It is known in the industry to reduce this bond by adding low molecular weight glycols. Further, it known to obtain additional bond strength decreases by adding additional glycols or glycol esters such as polyethylene glycols or fatty esters of polyethylene glycols. Additionally, dispersions of mineral oils, silicone oils or natural or synthetic waxes can be used to effect decreases in bond strength, as well as function as a defoamer for the aqueous system.

Beaver et al., U.S. Pat. No. 3,124,474 discloses adhesives of water soluble cellulosics and glycol plasticizers in a water solvent.

Maxwell, U.S. Pat. No. 4,508,773 shows the addition of magnesium sulfate to an animal based glue formulation including polyols as plasticizers. In that environment, magnesium sulfate increases the bond strength, the opposite of the effect of the magnesium sulfate in the adhesive composition of the present invention. Maxwell further shows the unpredictability of the action of magnesium sulfate in the composition.

There remains a need for a rolled substrate material product tail tie adhesive composition which exhibits improved releasability and leaves no stain. Moreover, there remains however a need to further reduce the dried bond strength, or alternatively to obtain a reduced bond strength with inexpensive materials.

SUMMARY OF THE INVENTION

This invention generally relates to a water-based tail tie adhesive composition for a rolled substrate material comprising:

a) at least one water soluble cellulose derivative; and b) an effective amount of magnesium sulfate.

The water-based tail tie adhesive composition can further comprise at least one water soluble polyol. The water soluble polyol comprises at least one water soluble monomeric polyol, at least one water soluble polymeric polyol and combinations thereof The water-based tail tie adhesive composition can further comprise at least one functionalized polymeric polyol including polyester polyol, polyether polyol, polyesterether polyol, polyhydroxy compound and combinations thereof.

Another aspect of the invention involves reducing the amount of relatively expensive glycolic bond strength reducers by incorporating magnesium sulfate (epsom salt) for a portion of the glycolic bond strength reducers. The magnesium sulfate is added to the tail tie adhesive composition to reduce the dried bond strength so as to facilitate the separation of the tail end from the body of the roll without tearing the tissue or toweling.

Still another aspect of the invention is directed to a rolled substrate material comprising a web of substrate material rolled onto a cylindrical core, the tail end of said rolled substrate being secured to the roll by a film of the tail tie adhesive composition.

Yet another aspect of the invention is directed to a method of using the water-based tail tie adhesive composition in the manufacture of a rolled substrate material to secure the loose tail end of the roll.

These and other aspects of the present invention would be apparent to one of ordinary skill in the art from the following detailed description illustrating the preferred embodiments of the invention.

DETAILED DESCRIPTION OF THE INVENTION

Figure 1:
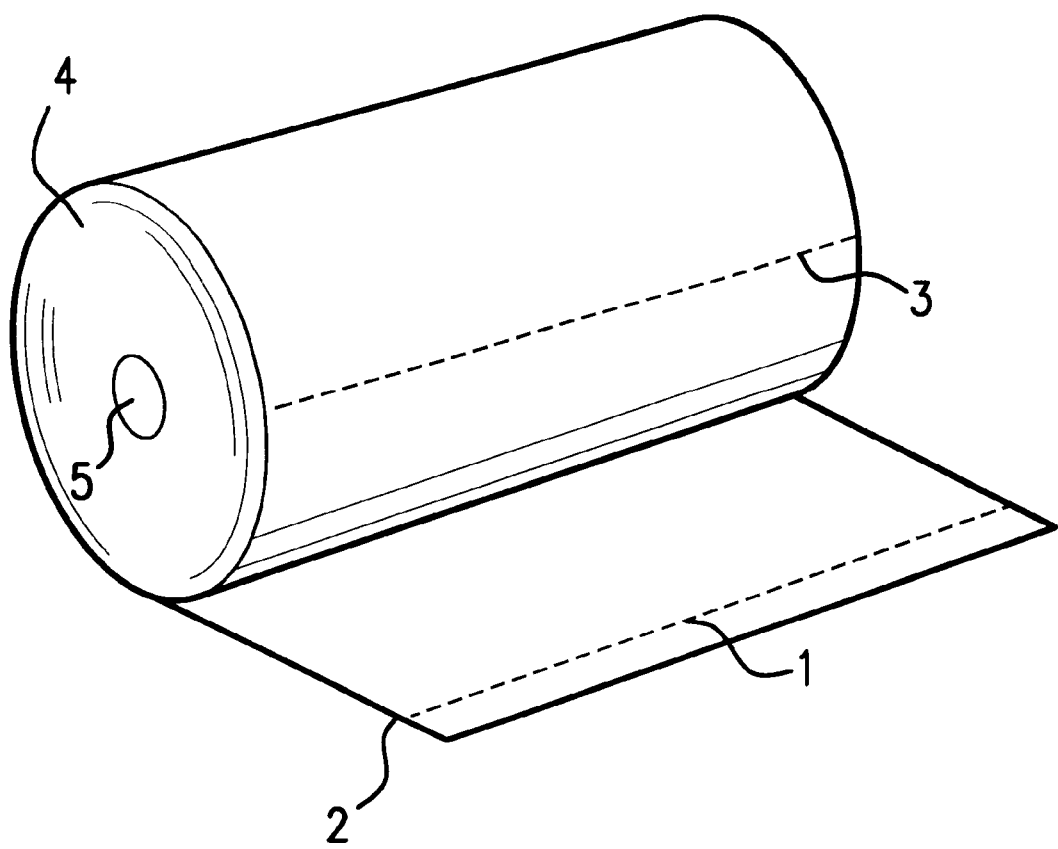
FIG. 1 illustrates a rolled paper product comprising a cylindrical core about which the body of the roll is wound. The loose tail of roll is secured by the tail tie adhesive.

The following glossary is provided as an aid to understand the use of certain terms herein. The explanations provided in the glossary are for illustrative purposes and do not limit the scope of the invention.

The term "effective amount" means an amount sufficient to accomplish the intended purpose.

"Water soluble cellulose derivatives" include cellulose ethers, hydroxyethyl cellulose, hydroxyethyl cellulose (hydrophobically modified), hydroxypropyl cellulose, hydroxy propyl methyl cellulose, hydroxy propyl ethyl cellulose, hydroxymethyl cellulose, methyl cellulose, ethyl cellulose, methyl ethyl cellulose, ethylhydroxyethyl cellulose, cyanoethylcellulose, cellulose gum, carboxymethylcellulose, carboxymethyl hydroxyethyl cellulose, calcium carboxymethylcellulose, sodium carboxymethyl cellulose, and the like. Commercially available cellulose derivatives include Klucel® from Aqualon which is hydroxypropylcellulose; Methocel® from Dow Chemical Co. which is hydroxypropyl methyl cellulose; Cellosize® QP 100MH from Union Carbide which is hydroxyethylcellulose that has been surface treated to be water dispersible or quick processed having a viscosity of about 100,000 cps with 2% solids. J-75MS® from Dow Chemical is hydroxypropylmethyl cellulose which has been surface treated and has a 2% solution viscosity of 75,000 cps. CMC 7H® from Aqualon is sodium carboxymethyl cellulose having a high viscosity range. A preferred water soluble cellulose derivative is hydroxy propyl cellulose, preferably hydroxy propyl methyl cellulose. The water soluble cellulose derivative is present in the composition in an amount of at least about 0.5 to about 2% by weight, preferably about 0.8 to about 1.0% by weight.

"Water soluble polyols" to make the composition of the present invention include water soluble monomeric polyol, water soluble polymeric polyol, functionalized polymeric polyol and combinations thereof The water soluble monomeric polyol include any polyol such as diol, triol, tetraol and combinations thereof, having a molecular weight of less than 400, may be used. Examples of water soluble monomeric polyol are glycerin, propylene glycol, diethylene glycol, dipropylene glycol, triethylene glycol and tetramethylene glycol. Commercially available glycols include water soluble 75-H series, UCON lubricants from Union Carbide.

The water soluble polymeric polyol includes polyols having molecular weights from about 400 to about 12,000, preferably about 400 to about 8,000. The water soluble polymeric polyol include water soluble polymeric polyol such as polyethylene glycol, polypropylene glycol and mixtures thereof Commercially available glycols include polyethylene glycols such as polyethylene glycol 8000 ® from Dow Chemical Co. and carbowax® from Union Carbide, polyethylene wax emulsions and paraffin wax emulsions.

The functionalized polymeric polyol include polyester polyol, polyether polyol, polyesterether polyol, polyhydroxy compound and combinations thereof. The functionalized polymeric polyol is present in an amount of about 0.2% to about 5% by weight, preferably about 0.5% to 2% by weight, most preferably about 0.3% to about 1% by weight.

The functionalized polyols can be either low or high molecular weight materials and in general will have average hydroxyl values as determined by ASTM E 222-67, Method B, between about 1000 and 10 and preferably between about 500 and 50.

The functionalized polyol component may comprise an acid grafted polyether polyol such as polypropylene oxide grafted with for example, maleic or fumaric acid as taught in Frentzel, U.S. Pat. No. 4,460,738 or Knopf, U.S. Pat. No. 4,528,334 and are incorporated herein by reference. Other polyester polyols produced from mixtures of di- and tri- or higher functional acid and polyol components in ratios which provide residual acid functionality as well as plural hydroxy groups may be employed.

Polyester polyol can be prepared by polyesterification of organic polycarboxylic acid or anhydride thereof with organic polyols. Usually, the polycarboxylic acid and polyol are aliphatic or aromatic dibasic acids and diols. Any ester of the monomeric polyol and polymeric polyol can be used. Examples of these are fatty esters of polyethylene glycols having a molecular weight of about 400 to about 12,000, preferably about 800 to about 8,000. Suitable polyester polyols are sold by Ruco Corp. Other polyester polyol includes Myrj®45 from ICI which is a polyoxyl 8 stearate.

Alternatively, the polyol component may comprise a mixture of a polyol free of acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, aminosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, αalanine, 6 aminocaproic acid, the reaction products of ethanolamine and acrylic acid, hydroxyethylpropionic acid, 2 hydroxyethanesulfonic acid and sulphanilic acid.

The most suitable functionalized polymeric polyols include polyalkylene ether polyol including thioethers, polyester polyols including polyhydroxypolyesteramides, and hydroxy containing polycaprolactones. Any suitable polyalkylene ether polyol may be used. Included are polyoxytetramethylene glycol, polyoxyethyleneglycol, polypropylene glycol and the reaction products of ethylene glycol with a mixture of propylene oxide and ethylene oxide. Commercially available water soluble polyethylene oxide include Polyox® from Union Carbide.

Also useful are polyether polyols formed from the oxyalkylation of various polyols. For example, glycols such as ethylene glycol, 1,6 hexanediols, Bisphenol A and the like, higher polyols such as trimethylolpropane, trimethylethane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of an acidic or a basic catalyst.

The polyhydroxy compound can have a molecular weight of at least less than about 400 to about 3,000, preferably about 1,000 to about 2,000. Examples of polyhydroxy compounds include sorbitol, mannitol, corn syrup, dextrin, fructose, sucrose and combinations thereof The polyhydroxy compound is present in an amount of about 0.5% to about 5% by weight, more preferably about 0.5 to about 3% by weight.

Magnesium sulfate (epsom salts) in the adhesive tail tie formulation is found to dramatically reduce the dry bond strength of the adhesive, i.e., improved dry release, without causing any appreciable change in the viscosity, rheology, wet tack or residual staining. This is surprising in view of the prior art where magnesium sulfate tends to increase the dry bond strength. It is also non-corrosive, highly water soluble, neutral in pH and GRAS listed making it ideal for use in tail tie adhesive composition. The amount of magnesium sulfate used depends on the dry release desired and the amount of other dry release agents. In a broad aspect, any amount of magnesium sulfate up to its solubility limit in the adhesive formulation can be used. The magnesium sulfate is present in an amount of about 0.5% to about 10% by weight, preferably about 0.7% to about 7% by weight, more preferably about 0.7 to about 6% by weight based on the entire adhesive composition.

Magnesium sulfate in the USP form is recommended for household toweling applications to meet the requirements of 21 CFR (FDA). Paragraph 176.170 for paper products coming into contact with aqueous and fatty foods. Other grades can also be used for applications where such requirements are not needed.

Any additive conventionally added to tail tie or tail control adhesives can be added to the composition. Examples of such additives include but not limited to the following:

a) surface active agents such as Surfynol® 104S from Air Products, Inc., Hypermer® PS-4 (ICI) and the like;

b) defoamers include FG-10®, Base® 41-2, Nopco® NDW, Colloid® 581-B, Colloid® 796, Foamaster® VF and the like.

c) preservatives include commercially available preservatives such as methyl paraben, Nuosept, Kathon® LX 1.5, Amerstat 251 ® and mixtures thereof.

The defoamer and preservatives are added to the composition in an amount effective to control foaming and prevent spoilage. The preservatives are present in the composition in an amount of about 0.15% to about 0.3% by weight of the adhesive. A preferable amount of methyl paraben is about 0.18% to about 0.4% by weight. A preferable amount of Kathon® LX1.5 and Amerstat 251® is about 0. 15% to about 0.3% by weight.

The water-based tissue/towel tail tie adhesive composition of the present invention comprises at least one water soluble cellulose derivative, at least one or more of water soluble monomeric polyol, at least one or more polymeric polyol, magnesium sulfate, and optionally, at least functionalized polymeric polyol such as polyester polyol, polyether polyol, polyesterether polyol, polyhydroxy compound and combinations thereof, and conventional additives such as defoamers to control foaming and preservatives to prevent spoilage. More specifically, the water-based tissue/towel tail tie adhesive composition of the present invention comprises from about 0.5% to about 2.0% by weight of cellulose derivative; a water soluble monomeric polyol, preferably, a propylene glycol; in the amount of from about 0.3% to about 5% by weight; preferably about 0.75% to about 1.96% by weight; more preferably about 0.8% by weight; from about 1% to about 10% by weight of a water soluble polymeric polyol such as polyethylene glycol of a molecular weight of from about 400 to 8,000; preferably about 2.5 to about 6.7% by weight, more preferably about 3.1% by weight; optionally, a functionalized polymeric polyol, preferably a water soluble or a water dispersible glycol ester in the amount of from about 0.5% to about 2% by weight, preferably about 0.3% to about 1% by weight; and magnesium sulfate (epsom salt) in the amount of from about 1% to about 5% by weight, preferably about 0.7% to about 3.75% by weight, more preferably about 0.7 to about 1.75% by weight.

The viscosity of the tail tie or tail control adhesive composition is about 1,000 cps to about 14,000 cps at a temperature of about 85° F., preferably about 1,000 cps to about 5,000 cps for tissue paper and about 2,000 cps to about 14,000 cps for paper towels.

It has been discovered that the ratio of cellulose derivative to the glycol in the adhesive should be at least about 1:4 to about 1:11. The total % solids is about 2.5% to about 12.5%, preferably about 3.5% to about 10.5%.

Common table salt (NaCl), alum and urea have been evaluated for efficacy in typical tail tie formulations. NaCl and alum caused a modest reduction in the dry bond strength, but considerably less of a reduction than magnesium sulfate. Magnesium sulfate is unique, particularly in its unexpected action when compared to other metal salts.

The present adhesive composition is preferably applied at a temperature of about 15° C. to about 38° C., preferably, about 22° C. The adhesive is applied in the same manner as conventional tail tie adhesives, i.e., applied by spray, extrusion methods, roller or other conventional methods to the loose tail of the roll and rolled up tight to the body of the roll. For example, the adhesive may be applied on-machine to the substrate tail, or rolled simultaneously with the cutting of the substrate web and transfer thereof to a new core. After cutting the substrate sheet, continuing rotation of the rewound roll on the rotatable mandrel causes the adhesive carrying tail to wrap about the roll, rapidly forming a secure bond of the tail to the roll. More commonly, the tail is secured to the roll off-line. The roll is located or indexed to expose the body of the roll and the tail tie adhesive is applied either to the body of the roll or to the portion of the tail exposed or laid out from the body.

The tail tie adhesive composition is employed as an adhesive for securing the tail end of the rolled substrate material. The rolled substrate material includes consumer paper towels, toilet tissue, gift wrapping paper, or industrial towels, printing paper, business machine paper or bag stock paper, particularly paper towel or toilet tissue paper. The substrate materials employed in the present invention include all rollable material. A transfer or pick up adhesive is applied to the first wound sheet or portion of a substrate material to a cylindrical wrapping core. The cylindrical core may be manufactured from any suitable material such as chip board, paperboard, cardboard, solid bleached sulfate or plastic.

Referring to FIG. 1, a rolled paper product comprises a cylindrical core 5 about which a rolled body of for example, tissue or towel 4 is wound. The tail of the roll 2 is bonded to the body of the roll 3 by means of a tail tie adhesive 1. The tail tie adhesive is applied by spray, extrusion, roller or other suitable means, usually to the tail. Alternatively, the tail tie adhesive may be applied to the body of the roll by similar application methods and then rolled up by bringing the loose tail into contact with the adhesive body of the roll. A grade of tissue suitable for the purpose of the invention is selected and the adhesive to be evaluated is applied to the face of the sheet of the tissue by spraying the adhesive under pressure, through extrusion, or by an orifice extrusion by exertion pressure on the adhesive or by coating a film onto the tissue by some form of metering bar, rod or knife.

Although the invention has been described with preferred embodiments, it is to be understood that modifications and variations may be resorted to, without departing from the spirit and scope of the invention. As those skilled in the art will readily understand, such variations and modifications are considered to be within the purview and scope of the claims.

TEST METHODS

The following test methods are employed in testing of the samples.

Determination of the Coating Weight: (Method A)

The wet weight of adhesive coating applied by Method 1 can be determined by dividing the weight of adhesive applied to the total length of adhesive applied across the tails as measured in inches. The wet coating weight is calculated in grams of wet adhesive per linear inch.

The application of a measured weight of adhesive to the tissue tails results in an observable but only roughly measurable wetted width of the tissue or towel. The following corresponding values have been noted: about 3/32 inch wetted width corresponds to about 0.018 g of adhesive applied per lineal inch; about 1/8 inch wetted width corresponds to about 0.022 g of adhesive applied per lineal inch; about 3/16 inch wetted width corresponds to about 0.042 g of adhesive applied per lineal inch; and about ¼ inch wetted width corresponds to about 0.053 g of adhesive applied per lineal inch.

The preferred tail tie coating weight for bathroom tissue results in a wetted width of glue line of from about 3/32 inch to about 3/16 inch in width, A preferred tail tie coating weight for household towels results in a wetted width of glue line of from about 3/16 inch to about 5/16 inch.

Determination of the Dry Release or Bond Strength: (Method B)

Regardless of the method used in application of the tail tie adhesive, after a suitable drying time at room temperature conditions, the roll is placed onto a paint roller frame which is affixed to a heavy weight and which has been tared to zero reading on the electronic balance. The tail is pulled straight up from the assembly and as the glue line is approached, the pull exerted on the bond line is administered slowly and steady until the entire bond line is ruptured or released. A visual reading of the maximum (negative) value is noted as indicated by the electronic digital balance, the pull being exerted on the tail decreasing the load on the balance pan and indicated as a negative value. An average of all the bond lines is calculated and used for comparative purposes.

Determination of the Wet Tack of the Adhesive: (Method C)

Regardless of the method used to apply the tail tie adhesive, the ability of the freshly applied tail tie adhesive to provide a level of wet adhesion may be measured by utilizing the same paint roller frame upon the electronic balance as was used in Method B. In this case, the difference in the weight of the roll before and immediately following the adhesive application is noted and the roll under test is placed onto the paint roller frame. The roll is rotated so that the wet adhesive bond line is facing directly upwards. A very gentle upward pull is exerted on the leading edge of the tail and the force necessary to separate the tail from the roll through the width of the glue line is noted. Typical wet tack values for tissue and towel tail ties are in the range of from about 2.5 grams per lineal inch to about 4 grams per lineal inch.

Determination of the Wet Tack of the Adhesive: (Method (D)

An alternate method of evaluating the wet tack of a subject toweling tail tie adhesive prepared as described in Method 3 is conducted directly against a comparison adhesive by attaching small equal weights to each of the toweling tails to be tested. The mass is chosen by trial and error to be that necessary when hung from the tail so as to cause a slow peeling delamination of one or other of the subject adhesives. The tail which remains adhered to the body of the roll for a longer time than the other adhesive is said to have the greatest wet tack.

Visible Stain (Method E)

The toilet tissue or towel was observed for any visual stain. No visual stain was observed using the tail tie adhesive of the present invention.

Dry Releaseability (Method F)

The evaluation of the dry releasability and dry bond are related to each other, e.g., a lower dry bond strength value is equivalent to better dry releasability. Thus, a dry bond capable of tearing the paper substrate would actually represent a value of zero dry release. Also, a zero dry bond value would represent 100% dry release. It is preferred that some dry bond formation is present in order to enable the tail of the tissue or towel to be held in place to the body of the roll. However, such bond must not be so well formed so as to be subjectively difficult to pull the tail of the roll loose from the body of the roll.

EXAMPLES

Prior to the application of the adhesive one or more rolls of tissue or towel suitable for the purpose of the invention are selected and are weighed to establish a base weight. A tissue tail length of about 10 to about 12 inches of each roll is unwound and laid flat on the table surface in preparation of the application of the tail tie adhesive. In the case of household towels, the exposed length of tail is cut lengthwise into two equal-width test strips.

Application of the Wet Adhesive: (Application Method 1)

A graduated syringe is filled with the test adhesive and a small hypodermic needle, preferably a # 22×1 inch, is affixed to the syringe. While holding the tip of the needle close to the tissue or towel, the test adhesive is applied in straight line across the width of the tissue or towel tail by the application of steady pressure to the syringe plunger while simultaneously moving the tip of the needle steadily across the width of the tissue or towel tail.

Immediately following the application of the adhesive, the exposed tail is rolled tight to the body of the roll and the one or more completed rolls are weighed to determine the total weight of adhesive applied as measured in grams.

Application of the Wet Adhesive; (Application Method 2)

An alternative method of application of the tail tie adhesive involves the use of a slotted metal glue applicator machined so as to leave about ¼ inch wide strip of adhesive of about 0.001 inch in thickness in its path when drawn across a substrate such as the tissue or towel tail. Applying the adhesive to the tissue consists of laying a sheet of copy alongside the tissue tail but overlaid upon the tail by about 1/16 inch. The bar applicator is placed upon the copy paper close to the edge and an excessive but small amount, preferably about 0.3 grams of adhesive is placed into the tapered enlarged opening leading to the 0.001 inch ×¼inch gap machined into the applicator bar. The adhesive-filled coating bar is carefully drawn from the copy paper mask across the tissue tail in a straight line. Immediately following the adhesive application, the adhesive coated tail is rolled up tight to the body of the roll. In this method, the weight of adhesive applied can be determined by the difference in weight between the adhesive coated roll and the uncoated roll. By the use of this method, the measured weight of wet adhesive applied to the tissue was determined to be from about 0.02 to about 0.03 grams per lineal inch of glue line.

Application of the Wet Adhesive: (Application Method 3)

Yet another method of application of the tail tie adhesive specifically to a household towel tail involves the use of a smooth or a wire-wound coating rod which can be selected from a range of available sizes so as to leave more or less of a thickness of adhesive in its path when pulled across a substrate surface while a small excess amount of adhesive is present on the substrate in contact with the leading edge of the wire wound coating rod. In this case, the exposed towel tail is split into two equal widths as previously described and folded back underneath itself for a distance of several inches. A measured mark is made about 1 inch from the leading edge of the folded tail. A protective masking sheet of copy paper in laid upon the towel tail positioned so as to be even to the marked line. The coating rod is placed upon the masking sheet a short distance in back of the line. Approximately about 1 milliliter of the adhesive to be evaluated on each tail half is placed into the nip area at the leading edge of the coating rod and the rod is pulled across the exposed 1 inch portion of the tail, thus coating it with the adhesive. It is desired that some excess of the adhesive be drawn off the exposed portion of tail onto the tabletop. Immediately after the adhesive is applied, the masking paper is removed and the tail is rolled into contact with the body of the roll. A coating weight of adhesive adequate to provide a determination of wet tack can be made with from a smooth #0 to a # 40 wire-wound coating rod. The amount of adhesive left on each towel tail half will range from about 0.25 grams to about 0.5 grams depending on the fluid properties of the tail tie and also the absorbency and embossing texture of the towel sheet.

Example 1

The following ingredients were blended at 25° C.

| Ingredients | % by weight |
| --- | --- |
| Water | 93.15 |
| PEG 8000 | 3.10 |
| Propylene glycol | 0.80 |
| Methocel | 0.80 |
| Amerstat 251 | 0.15 |
| Nuosept | 0.15 |
| VF | 0.05 |
| Magnesium sulfate | 1.75 |

Example 2

Example 2 is similar to Example 1 except that sodium chloride was used in place of magnesium sulfate.

Example 3

Example 3 is similar to Example 1 except that alum was used in place of magnesium sulfate.

Example 4

Example 4 is similar to Example 1 except that urea was used in place of magnesium sulfate.

Example 5

Example 5 is similar to Example 1 without adding magnesium sulfate or any inorganic salt.

Example 6

The following ingredients were blended and heated at 50° C.

| Ingredients | % by weight |
| --- | --- |
| Water | 92.35 |
| PEG 8000 | 3.10 |
| Propylene glycol | 0.80 |
| Methocel | 0.80 |
| Myrj 45 | 0.80 |
| Nuosept | 0.15 |
| Amerstat 251 | 0.15 |
| FG-10 | 0.10 |
| Magnesium sulfate | 1.75 |

Example 7

The following ingredients were blended and heated at 50° C.

| Ingredients | % by weight |
| --- | --- |
| Water | 91.57 |
| PEG 8000 | 3.88 |
| Propylene glycol | 1.00 |
| VF | 0.06 |
| Methocel | 1.00 |
| Myrj 45 | 0.90 |
| Magnesium sulfate | 2.19 |
| Nuosept | 0.15 |
| Amerstat 251 | 0.15 |

The test for evaluating the dry bonds or release were conducted on a variety of 2-ply laminated wet strength household towels obtained from several toweling converters. Table 1 is a comparison of bonding to various towels using Method 1 for adhesive application and Method D for the determination of wet tack.

By means of a spray gun, extrusion, roller or other conventional techniques, the resulting adhesive composition was applied as a film to toilet tissue or paper towel tails. Each adhesive composition was applied with similar coat thickness. The coating weight was approximately about 0.12 gms/lineal inch. The bonds on the towels were made with the adhesive of Example 1. The adhesive exhibited properties such as high initial tack and upon drying, the adhesive bond between the tail and the roll is surprisingly releasable. The adhesive did not leave any visible deposit or stain on the paper and did not impair the flexibility of the paper.

TABLE 1

Comparison of bonding to various towels

| Towels | Dry bond | | Wet Tack | | Visible Stain |
| --- | --- | --- | --- | --- | --- |
| | Control w/o Epsom | w/ Epsom | Control w/o Epsom | w/ Epsom | |
| EA | 53 gm ave | 19 gm ave | control | equal | No |
| EB | 157 gm ave | 49 gm ave | control | equal | No |
| EC | 361 gm ave | 118 gm ave | control | equal | No |
| ED | 83 gm ave | 32 gm ave | control | equal | No |

Legend: EA, EB, EC and ED are commercial 2-ply laminated wet strength household towels A comparison of the dry bond strength and dry releasability was conducted on the composition of Examples 1–5. Each adhesive composition was applied with similar coat thickness. The application of the adhesive is in accordance with application Method 2 and the dry release was conducted using Method B. The results of the comparison at the same coating weight are shown in Table 2. The coating weight is approximately about 0.02 to about 0.03 gms/lineal inch. The tail tie adhesive composition containing magnesium sulfate has a low dry bond strength and an excellent dry releasability as compared to adhesive compositions containing sodium chloride, alum, urea and w/o inorganic salt.

TABLE 2

Comparison of compositions to Tissue using NaCl, alum, urea and magnesium sulfate

|  | Dry bond strength | Dry Releasability |
|---|---|---|
| NaCl | 179 gm ave | 2 |
| Alum | 140 gm ave | 2 |
| Urea | 275 gm ave | 3 |
| Magnesium Sulfate | 112 gm ave | 1 |
| w/o Inorganic salts | 188 gm ave | 2 |

Legend: I = excellent; 2 = fair; 3 = poor

Table 3 shows the dry bond of a composition comprising cellulose derivative and magnesium sulfate in the absence of the water soluble polyol. The results show that magnesium sulfate affects the viscosity and bond strength. At about 4% and 6% magnesium sulfate, the magnesium sulfate reaches its limit and the dry bond starts decreasing.

TABLE 3

Dry Bond and Viscosity of Adhesive Composition in the absence of polyol

| % Methocel | % Magnesium Sulfate | Viscosity Cps at 72° F. | Application Rate in mg/inch | Dry Bond in gf/in |
|---|---|---|---|---|
| 0.8 | 0 | 1,285 | 27 | 70.7 |
| 0.8 | 0.5 | 1,300 | 27 | 88.4 |
| 0.8 | 1.0 | 1,375 | 22 | 65.6 |
| 0.8 | 1.5 | 1,390 | 27 | 87.1 |
| 0.8 | 2.0 | 1,450 | 31 | 92.4 |
| 0.8 | 4.0 | 1,575 | 29 | 44.4 |
| 0.8 | 6.0 | 1,800 | 22 | 28.2 |
| 0.8 | 6.0 | 1,800 | 24 | 28.7 |
| 0.8 | 6.0 | 1,800 | 31 | 35.6 |
| 0.8 | 6.0 | 1,800 | 33 | 37.8 |
| 0.8 | 8.0 | 1,250 | 24 | 27.6 |
| 0.8 | 8.0 | 1,250 | 36 | 30.0 |

The above examples have been depicted solely for the purpose of exemplification and are not intended to restrict the scope or embodiments of the invention. The invention is further illustrated with reference to the claims that follow thereto.

What is claimed is:

1. A water-based tail tie adhesive for a rolled substrate material comprising:
   a) at least one water soluble cellulose derivative; and
   b) an effective amount of magnesium sulfate.

2. The adhesive of claim 1, further comprising at least one or more water soluble polyol.

3. The adhesive of claim 2, wherein the water soluble polyol is selected from the group consisting of water soluble monomeric polyol, water soluble polymeric polyol and combinations thereof.

4. The adhesive of claim 2, further comprising at least one functionalized polymeric polyol selected from the group consisting of polyester polyol, polyether polyol, polyester ether polyol, polyhydroxy compound and combinations thereof.

5. The adhesive of claim 1, wherein the water soluble cellulose derivative is selected from the group consisting of hydroxy propyl methyl cellulose, hydroxy methyl propyl cellulose, hydroxyethyl cellulose, hydroxypropyl cellulose, hydroxy propyl ethyl cellulose, hydroxymethyl cellulose, methyl cellulose, ethyl cellulose, methyl ethyl cellulose, ethylhydroxyethyl cellulose, cyanoethylcellulose, cellulose gum, carboxymethylcellulose, carboxymethyl hydroxyethyl cellulose, calcium carboxymethylcellulose, sodium carboxymethyl cellulose and combinations thereof.

6. The adhesive of claim 3, wherein the water soluble monomeric polyol is selected from the group consisting of ethylene glycol, propylene glycol, diethylene glycol, dipropylene glycol, triethylene glycol, tetramethylene glycol, and mixtures thereof.

7. The adhesive of claim 3, wherein the water soluble polymeric polyol is selected from the group consisting of polyethylene glycol, polypropylene glycol and mixtures thereof.

8. The adhesive of claim 3, wherein the water soluble polymeric glycol is a polyethylene glycol having a molecular weight of about 400 to about 12,000.

9. The adhesive of claim 4, wherein the polyhydroxy compound is selected from the group consisting of sorbitol, mannitol, corn syrup, dextrin, fructose, sucrose and combinations thereof.

10. The adhesive of claim 4, wherein the polyester polyol is a polyoxyl 8 stearate.

11. The adhesive of claim 1, wherein said magnesium sulfate is present in an amount of up to 6% by weight.

12. The adhesive of claim 1 wherein said at least one water soluble cellulose derivative is present in amount of about 0.5 to about 2% by weight.

13. The adhesive of claim 2, wherein water soluble cellulose (a) is present in an amount of about 0.5 to about 2%; water soluble polyol (b) is present in an amount of about 0.3 to about 5%; magnesium sulfate (c) is present in an amount of about 1 to about 6%; all percentages being by weight relative to the entire formulation.

14. The adhesive of claim 13, further comprising about 0.5% to about 5% of a functionalized polymeric polyol selected from the group consisting of polyester polyol, polyether polyol, polyesterether polyol, polyhydroxy compound and combinations thereof.

15. The adhesive of claim 1 further comprising a defoamer, a preservative and a surface active agent.

16. The adhesive of claim 1 wherein the substrate is selected from the group consisting of gift wrapping paper, industrial towels, printing paper, business machine paper, bag stock paper, toilet tissue and paper towel.

17. A rolled substrate material comprising a web of substrate material rolled onto a cylindrical core, the tail end of said rolled substrate being secured to the roll by a film of an adhesive composition of claim 1.

18. A rolled substrate material comprising a web of substrate material rolled onto a cylindrical core, the tail end of said rolled substrate being secured to the roll by a film of an adhesive composition of claim 14.

19. A process of securing the tail end of a roll of tissue or paper toweling to the roll comprising the steps of:
   a) applying a film of a water based tail tie adhesive to a tail end of a rolled substrate material comprising a web of substrate material rolled onto a cylindrical core of tissue or paper toweling, said adhesive comprising:
      i) at least one water soluble cellulose derivative; and
      ii) an effective amount of magnesium sulfate; and
   b) drying the adhesive;
   c) affixing the tail end to the substrate.

20. The process of claim 19, wherein the substrate is selected from the group consisting of gift wrapping paper, industrial towels, printing paper, business machine paper, bag stock paper, toilet tissue and paper towel.

21. The process of claim 19, wherein the adhesive is applied by a method selected from the group consisting of spraying, extrusion and roller.

22. The process of claim 19, wherein the tail end is affixed to the substrate material before drying the adhesive.

23. The process of claim 19, wherein the adhesive further comprises at least one water soluble polyol.

* * * * *